United States Patent [19]

Mayer

[11] 4,085,594

[45] Apr. 25, 1978

[54] CONTROL SYSTEM FOR COOLING TOWER FANS

[75] Inventor: Robert Mayer, Ardmore, Pa.

[73] Assignee: Suntech, Inc., Wayne, Pa.

[21] Appl. No.: 768,295

[22] Filed: Feb. 14, 1977

[51] Int. Cl.² ............................................. G05B 11/18
[52] U.S. Cl. ...................................... 62/171; 62/183; 236/1 E; 318/306; 318/485
[58] Field of Search ................. 62/171, 183, 181, 510; 236/1 E; 307/39, 41; 318/306, 447, 485

[56] References Cited

U.S. PATENT DOCUMENTS

| | | | |
|---|---|---|---|
| 2,222,989 | 11/1940 | Robb | 62/171 X |
| 3,665,277 | 5/1972 | Velazquez | 318/447 |
| 3,853,174 | 12/1974 | Kramer | 62/183 X |

Primary Examiner—William E. Wayner
Attorney, Agent, or Firm—J. Edward Hess; Donald R. Johnson

[57] ABSTRACT

A control system for automatically controlling the operation of a plurality of fans for a cooling tower so that the minimum number of fans and the lowest speeds are used to provide the required cooling necessary at any one time. The fans are individually controlled in response to the temperature of the working fluid, to be either off or operated at a low or high speed so that as the temperature of the working fluid increases, more fans are turned on first to their low speed and then to their high speed. Safety features are provided for starting the system and for changing the speeds of the fans to prevent damage to the control system and unnecessary wear on the fan motors.

6 Claims, 2 Drawing Figures

4,085,594

CONTROL SYSTEM FOR COOLING TOWER FANS

BACKGROUND OF THE INVENTION

This invention is related to a system for controlling fans in response to temperature, and more specifically to a system for controlling the operation of a plurality of fans associated with a cooling tower in response to the temperature of the coolant being circulated through the cooling tower.

Many industrial processes require the use of a cooling tower in which large fans are mounted on the top of a baffled structure which is designed to permit heated water from the particular industrial process to drain down from the top to the bottom of the tower while air for cooling the water is drawn in at the bottom of the structure and forced out the top by the fans. The actual cooling requirements imposed on the cooling tower facility often varies as a result of changes in the operating conditions of the particular process being cooled and changes in weather conditions. Without automatic controls for the fans, the cooling system must be manually operated. This requires an operator for continuously monitor the temperature of the coolant being pumped through the tower and to turn the fans on and off, and change the speed of the fans, as the temperature of the coolant varies. Alternatively, the fans may be operated continuously at higher than required speeds.

As can be easily seen, either alternative can be quite expensive either in terms of the wasted energy from running the fans continuously at higher than required speeds or in terms of the cost of personnel for continuously monitoring the temperature of the coolant.

It would be desirable to have a control system which automatically controls the operation of the fans in response to temperature changes of the coolant. It is also desirable that such a system be designed to be easily connected to an existing manually operated control system such that the fans can be operated either manually or automatically.

SUMMARY OF THE INVENTION

In accordance with a preferred embodiment, an automatic control system is provided which includes a plurality of individual control circuits, each being responsive to three respective threshold temperatures of the coolant for controlling a fan, or a set of fans, such that they are either off or operating at a low or high speed. For a cooling tower system having several cooling fans, several individual control circuits can be used to control the different fans and are interconnected so that throughout each temperature range of the coolant, a particular number of fans are operating at predetermined speeds. As the temperature of the coolant increases, more fans are turned on, and as the temperature increases further, all the fans ultimately are turned on to their high speeds.

Each control circuit includes a Wheatstone bridge circuit having a temperature sensitive resistor, wherein the bridge is connected to two amplifiers such that when the coolant reaches a first predetermined temperature a signal is produced by one amplifier which turns the fan on to its low speed. When the temperature reaches a second predetermined temperature a signal is produced by the second amplifier which turns the fan on to its high speed.

A safety feature is also included within the circuit for disconnecting power to the fan motor before it is turned on to a low or high speed. This feature would prevent unnescessary wear on the motor if it had been previously turned on manually.

A starting system for the control circuit is provided which helps eliminate transients in the circuit when the circuit is first turned on, to prevent damage to the circuit components, and to prevent improper activation of the fan motors.

Several individual fan control circuits are used to control the several fans for a large cooling tower. Each fan, or each group of fans, is controlled by its respective control circuit. The temperature sensitive resistor for each control circuit can be the same, however it is preferably connected in combination with a different resistive network so that sequential operation of each control circuit is obtained as the temperature of the coolant rises.

An additional feature is provided for calibrating each control circuit in the control system so that each one is using the same reference point for monitoring the temperature of the coolant.

A better understanding of the invention and its advantage will become apparent in the following description of the drawings and the preferred embodiment.

DESCRIPTION OF THE DRAWINGS AND PREFERRED EMBODIMENT

For purposes of illustrating the operation of the cooling tower fan control system disclosed herein, it will be assumed that a cooling tower having three fans, each having a low speed and a high speed as well as a stop position, will be used. It is also noted that while one fan is being controlled by each individual fan control circuit 10, two or more fans could be connected in parallel to be operated by one individual fan control circuit.

Figure 1:
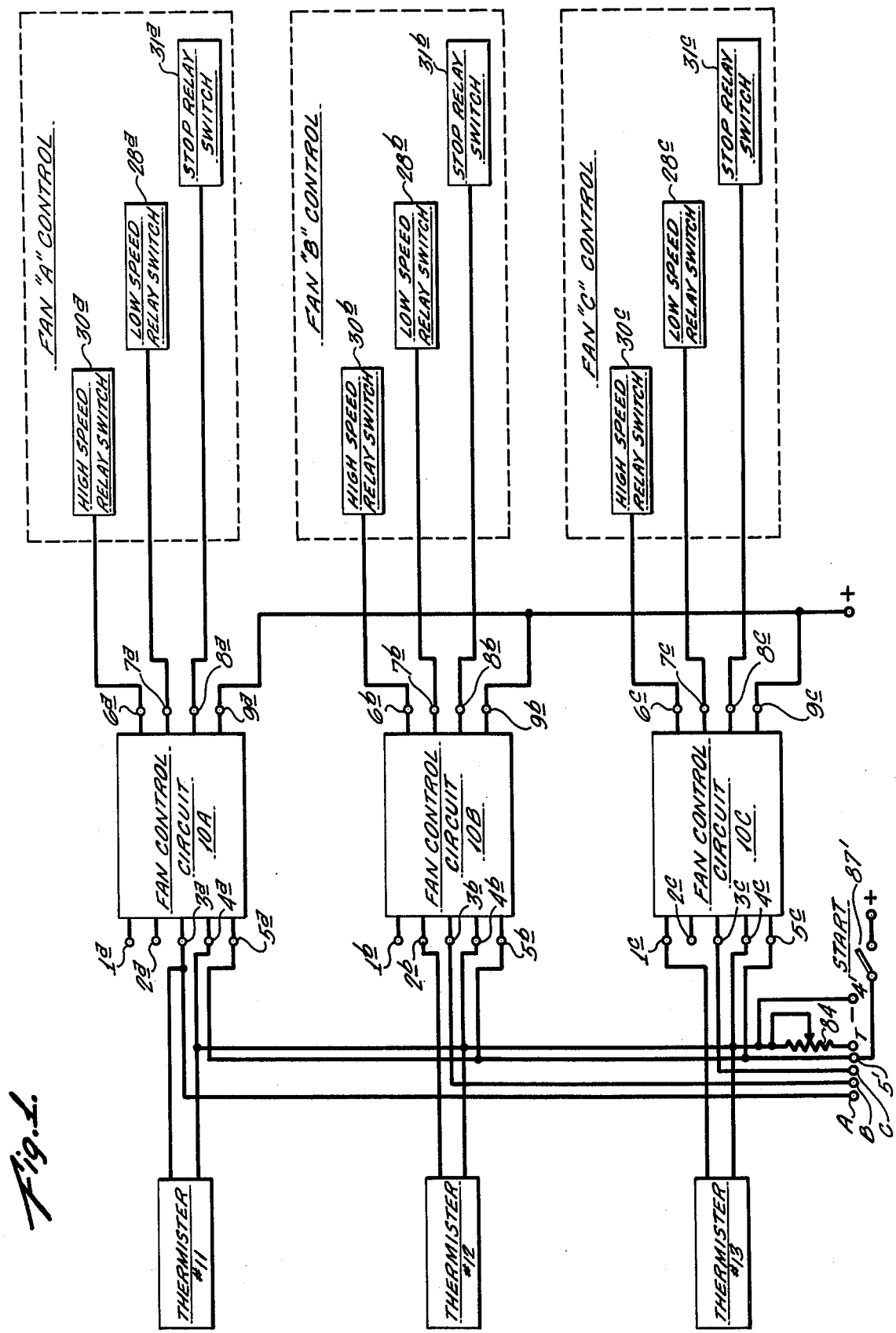
FIG. 1 is a schematic diagram of the cooling tower fan control system with several individual control circuits for controlling the operation of the fans individually.

Referring to FIG. 1, individual fan control circuits 10A, 10B, and 10C are connected to their respective temperature sensitive resistor, such as thermistors 11, 12, and 13 respectively, in such a manner that the fans are sequentially energized as the temperature of the coolant rises above predetermined values.

In most conventional manual systems for controlling cooling tower fans, each fan has a switch for each of its stop, low speed and high speed operating conditions. Each switch produces a signal for latching the fan motor into the particular operating mode associated with that switch. The automatic control system provided herein utilizes relay switches, or the equivalent, connected in parallel with each of the manual start switches and in series with each of the manual stop switches. The respective fan control circuit 10 for each fan is connected to three relay switches. For instance, fan control circuit 10A controls the energizing of high speed relay switch 30A, which causes the motor for fan A to achieve its high speed, low speed relay switch 28A, which causes the motor for fan A to achieve its low speed, and stop relay switch 31A, which prevents any power from being supplied to the motor for fan A even if relay switch 30A or 28A is energized. The same system arrangement is applicable for each other control circuit.

One possible sequential operation for the several fans, assuming an increasing temperature condition, is to have fan A turn on to its low speed, followed by fan B and eventually by fan C, all being energized at their low speed. As the temperature increases further, fan A is then placed in its high speed, followed by fans B and C as the temperature increases further, which thereby provides the maximum cooling potential. As the temperature starts to fall, the sequence operates in a reverse fashion until fan A reaches it low speed position and eventually is turned off, should the temperature fall below that required for cooling. The particular temperature interval between each change in fan speed would necessarily vary between different cooling systems, however, a typical value might be in a range of 1° to 2° F.

Figure 2:
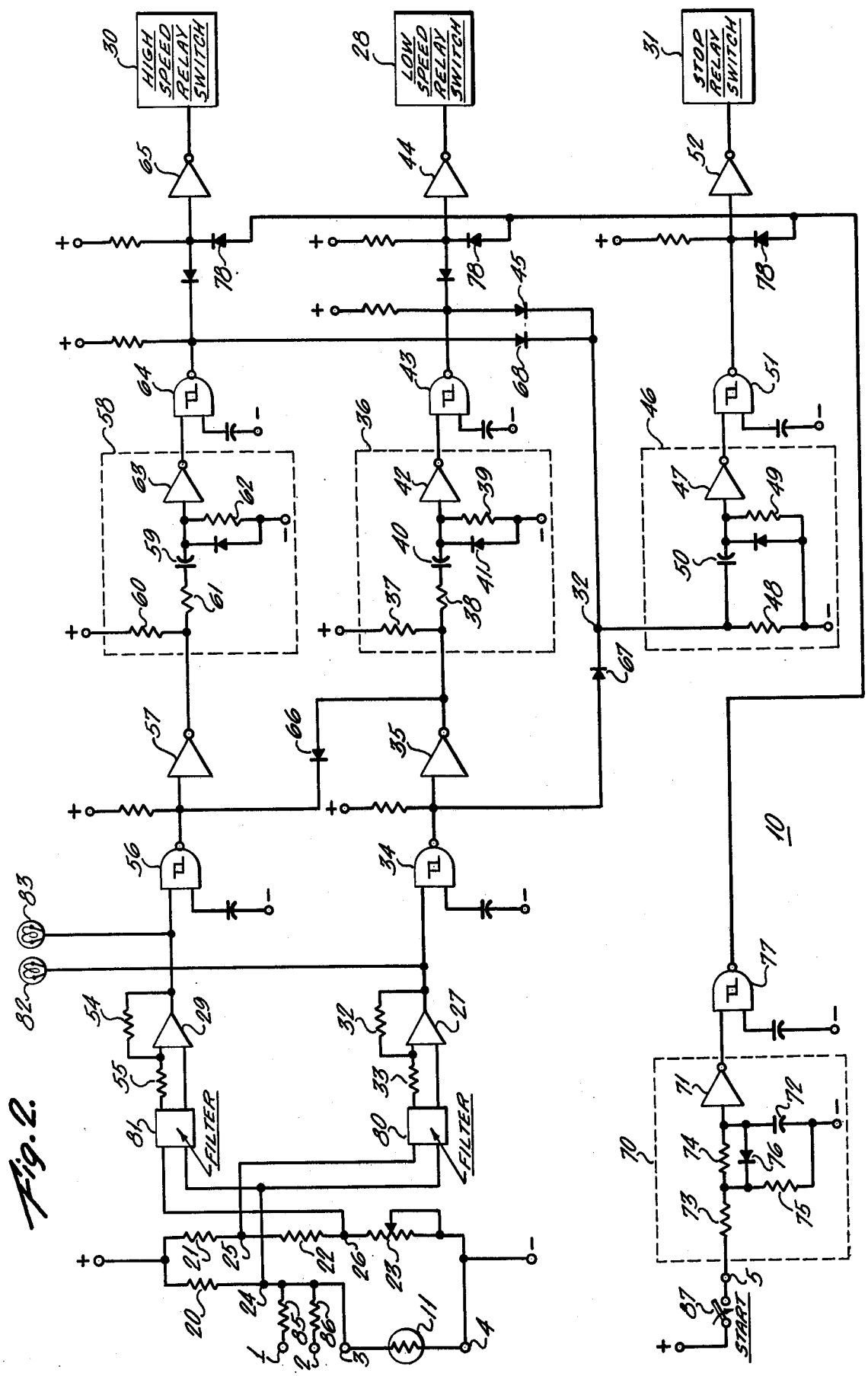
FIG. 2 is a circuit diagram of the individual control circuits identified in FIG. 1.

Referring to FIG. 2, the general operation of the individual fan control circuit 10 will be explained. Control circuit 10 has a Wheatstone bridge which comprises resistors 20, 21, 22, potentiometer 23, the thermistor 11. The positive and negative DC voltage inputs are indicated by the plus and minus signs, as they are throughout the circuits illustrated in the figures. Voltage outputs are taken from the Wheatstone bridge at terminals 24 and 25 for the low speed actuation signal, and from terminals 24 and 26 for the high speed actuation signal.

The low speed relay actuation section of the control circuit includes amplifier 27 and those elements shown in FIG. 2 which are generally in line between amplifier 27 and the low speed relay switch 28 for fan A. The high speed relay actuation section of the circuit includes amplifier 29 and those elements generally in line between amplifier 29 and high speed relay switch 30 for fan A. The third major section of this circuit is for energizing the stop relay switch 31 for fan A and includes those elements shown toward the bottom of FIG. 2 extending from terminal 32 to stop relay switch 31.

The control circuit 10 is designed so that as the temperature rises, the resistivity in thermistor 11 changes such that the voltage received by amplifier 27 on its positive input terminal becomes greater than that received on its negative input terminal, which causes an activating signal in the form of an output pulse for energizing low speed relay switch 28. However, at the same time, a signal is received at terminal 32 so that stop relay switch 31 is energized to disconnect the power to the motor for fan A. This feature for simultaneously energizing the stop relay switch along with one of the other relay switches acts to prevent wear on the motor and connecting linkage to the fan in the event the fan is rotating at a different speed than that commanded due to previous automatic or manual actuation. However, stop relay switch 31 is energized only for a few seconds, which is usually a long enough time duration to permit the fan and its motor to return to a rate of rotation below that designated as low speed, while relay switch 28 will remain energized for a longer time period to start the fan on low speed.

As the temperature increases further, a high speed actuating signal in the form of an output pulse, is produced by amplifier 29 when the voltage potential on terminal 26 becomes greater than that on terminal 24 of the Wheatstone bridge, thereby energizing high speed relay switch 30. At the same time, stop relay switch 31 is energized for a short time interval, in a manner similar to that which occurs when energizing low speed relay switch 28. Again, this momentary stop action permits fan A and its motor to slow down slightly before receiving power to operate at its high speed. While the temperature of the coolant remains above that for requiring high fan speed, the low speed relay actuation section of the circuit is disabled so that low speed relay 28 is not energized.

Simultaneous energization of stop relay 31 with low speed relay 28 also occurs as the temperature of the coolant falls. Fan A remains latched in its high speed mode until the temperature falls below the temperature required to produce the high speed actuating signal from the Wheatstone bridge and amplifier 29. The low speed relay actuation section becomes enabled so that low speed relay switch 28 is energized to place fan A in its low speed mode. However, at the same time, stop relay 31 is energized for a time duration sufficient to permit the speed of fan A to slow down below that for its low speed in order to prevent wear on the fan motor and the linkage between the fan and its motor due to a sudden braking force from the low speed energization. Should the coolant temperature continue to fall and reach a level for which no cooling action by fan A is required, no actuating signal is produced and stop relay 31 is then energized to shut off the power being supplied to the motor for fan A.

The fourth section of circuit 10 operates as a starting system to properly condition the other sections of circuit 10 so that upon applying power to circuit, the logical elements operate properly.

A more detailed description of the operation of the control circuit now follows. Assuming that the control circuit has been properly turned on through the starting system, as will be discussed in more detail below, and that the temperature of the coolant being monitored is below that which would require the fans to operate, the voltage potential on terminal 24 would be greater than that on terminals 25 or 26 in the bridge circuit. As the temperature in the coolant begins to rise, at some point, depending on the particular thermistor 11, and any other resistance combined with it between terminal 24 and the negative terminal of the bridge, the resistance on thermistor 11 will have changed enough so that the potential on terminal 25 will become greater than that on terminal 24. At this time, the output on amplifier 27 reaches a high (or one) condition as a result of the positive feedback resistor 32 in combination with the input resistor 33.

Schmidt-trigger 34, which has a NOT · output, changes the one to a zero, which is again changed to a one by inverter 35. The output of inverter 35 is received by time delay circuit 36, which is an analog circuit comprising resistors 37, 38 and 39, capacitor 40, diode 41 and high input impedance inverter 42. Time delay circuit 36 acts to immediately pass to inverter 42 a high potential essentially equal to the one condition imposed on the time delay circuit. This high potential is inverted to a low potential by inverter 42. Schmidt-trigger 43, which has a NOT output, responds to the low potential by producing a digital one. Resistors 37, 38 and 39 act to gradually charge capacitor 40, which causes the low potential output of inverter 42 to gradually return to a high potential. Schmidt-trigger 43 produces a zero at some point immediately before the low potential from inverter 42 reaches its low potential. The net result is a digital one produced by Schmidt-trigger 43 having a predetermined duration related to the time constant of time delay circuit 36, which duration is controlled by the RC combination of resistors 37, 38 and 39 and capacitor 40. Diode 41 in time delay circuit 36 acts to protect the inverter 42 by discharging capacitor 40 when the input signal to time delay circuit 36 drops to zero.

The output pulse from Schmidt-trigger 43 is received by an inverter 44, which produces a zero which energizes low speed relay switch 28 for the duration of the pulse from Schmidt-trigger 43. However, the low speed energization of the motor for fan A is momentarily delayed as explained below.

The pulse produced by Schmidt-trigger 43 also passes through diode 45 for receipt by a time delay circuit 46 at terminal 32 of the section of the control circuit associated with energizing stop relay 31. Time delay circuit 46 operates in a similar fashion as time delay 36, and produces an output signal through inverter 47 having a low potential which gradually becomes a high potential at a rate equal to the time constant of time delay 46. The time constant is related to the RC combination of resistors 48 and 49 and capacitor 50. Schmidt-trigger 51, which has a NOT output, produces a digital one having a duration related to the time delay provided by time delay circuit 46. The one is converted to a zero by inverter 52 which energizes stop relay switch 31, thereby disconnecting power to the motor for rotating fan A.

Both low speed relay switch 28 and stop relay switch 31 are energized at nearly the same time. However, stop relay switch 31 takes precedence since it precludes the application of any power to the fan motor. The time constant for time delay circuits 36 and 46 are set so that the time constant of circuit 46 is much shorter than that of circuit 36. As a result, after the output pulse from Schmidt-trigger 51 terminates, the output pulse from Schmidt-trigger 43 still remains and acts to energize low speed relay switch 28 so that the fan motor is latched to operate at its low speed. Relay switch 28 is the type of relay which, once it is energized, remains in an energized state even after the energizing signal is removed. The relay will become de-energized only after power is removed (by stop relay switch 31 which is in series with it).

As the temperature of the coolant continues to rise, terminal 26 eventually reaches a potential greater than that of terminal 24 of the bridge. A high (or one) condition then results from amplifier 29 because of its respective positive feedback resistor 54 in combination with input resistor 55. This section of the control circuit 10 which relates to actuating high speed relay switch 30, operates in a manner very similar to the section of the circuit for operating low speed relay switch 28. Schmidt-trigger 56 produces a zero at its output in response to the one produced by amplifier 29. This zero is changed to a one by inverter 57 and applied as a high potential to time delay analogue circuit 58, which is similar to time delay circuit 36. The high potential applied to time delay circuit 58 is passed to inverter 63 by capacitor 59, which is charged at a time constant related to the RC combination of resistors 60, 61, 62 and capacitor 59. The output of inverter 63, which is the output of time delay circuit 58, is a low potential which rises to a high potential at a rate related to a time constant of time delay circuit 58. Schmidt-trigger 64 then produces an output pulse having a duration related to the time constant of time delay circuit 58.

The output pulse from Schmidt-trigger 64 is converted to a zero by inverter 65 which energizes high speed relay switch 30. At the same time, the pulse from Schmidt-trigger 64 energizes stop relay switch 31 through diode 68, time delay circuit 46, Schmidt-trigger 51, and amplifier 52, in a manner similar to that described above for the section of circuit 10 related to energizing low speed relay switch 28.

After a time interval greater than the time constant for time delay circuit 46, stop relay circuit 31 is no longer energized and high speed relay switch 30, which has been and is currently energized, permits fan A to operate at its high speed by causing the fan motor to be latched into its high speed operating condition.

Also, at about the same time, high speed relay switch is being actuated, the section of circuit 10 related to energizing low speed relay switch 28 is conditioned so that low speed relay switch 28 is not energized as long as a high (or one) condition is present on the output of amplifier 29. This is accomplished by having the output of inverter 35 in the section for energizing low speed relay 28 connected to the output of Schmidt-trigger 56 in the section for energizing high speed relay 30 through diode 66, which clamps the output of inverter 35 down to the value for the output of Schmidt-trigger 56, which is a zero. Since the output of inverter 35 is a zero, no output pulses are produced by Schmidt-trigger 43 for eventually energizing low speed relay switch 28.

As the temperature of the coolant begins to fall, at some point the potential on terminal 26 of the bridge falls below that of terminal 24, thereby eliminating the output from amplifier 29. At this time, the output of Schmidt-trigger 56 reverts to a one, which permits the ouput of inverter 35 in the low speed section of circuit 10, to return to it high condition. Since the ouput on amplifier 27 has remained constant from the time it originally reached its high condition, a pulse is again produced by time delay circuit 36 to energize both low speed relay switch 28 and stop relay switch 31. Fan A is thereby permitted to slow down in the time span provided by time delay circuit 46 to a speed below its low speed. After stop relay switch 31 is no longer energized, fan A then runs at its low speed.

In the event that the temperature in the coolant should fall below that which would require any fans to be operating, the potential on terminal 25 in the bridge circuit falls below that of terminal 24, thereby eliminating the one output of amplifier 27. Schmidt-trigger 34 then produces a one output which is recieved through diode 67 by the section of circuit 10 which is associated with energizing stop switch 31. Again, a pulse is produced by time delay 46 so that stop relay switch 31 is energized to place fan A in its "off" position.

Control circuit 10 has a section for use when turning the system on which is designed for properly conditioning the circuit logic and eliminating transients before applying full power in order to prevent harm to the circuit. This function is accomplished by using a time delay circuit 70 which acts to delay the input of the start signal from on-off switch 87 for a predetermined time interval, which is related to the RC combination of resistors 73, 74, and 75 with capacitor 72. Diode 76 acts to rapidly discharge capacitor 72 when the power to the circuit is shut off.

When switch 87 is closed, the input to inverter 71 is at a low potential until capacitor 72 becomes charged. Schmidt-trigger 77 inverts the high output from inverter 71, and produces a zero which, through diodes 78, clamps to zero sections of control circuit 10 associated with high speed, low speed, and stop relay switches, such that these relay switches cannot be energized. One capacitor 72 becomes charged, the input to inverter 71 is a high potential, causing the output of time delay circuit 70 to produce a low potential, and Schmidt-trigger 77 to produce a one. The outputs of Schmidt-triggers 64, 43 and 51 are now free to operate in their normal fashion.

For greater versatility of fan control circuit 10, a few additional elements can be included in its construction. The bridge circuit can be designed so that the thermistor can be connected between one of several terminals within the bridge circuit to enable the entire fan control circuit to be used for various temperature responses, by merely connecting the thermistor across the appropriate terminals. This is illustrated in FIG. 2 wherein resistors 85 and 86 connecting terminals 1 and 2 to terminal 24, are provided. Thermistor 11 can be connected across terminals 3 and 4, as shown in FIG. 2, to make the bridge circuit responsive to one particular set of temperatures. Alternatively, thermistor 11 can be connected across terminals 1 and 4 or terminals 2 and 4 to provide different temperature response characteristics.

When a series of fan control circuits is utilized to control several fans, as illustrated in FIG. 1, fan control circuit 10A can be connected to its respective thermistor 11 across terminals 3a and 4a. Control circuit 10B and 10C can be connected to their respective thermistors across terminals 2b and 4b, and terminals 1c and 4c. With the proper choice of resistor values in the bridge circuit and of themistors, the sequential operation of three fans as discussed above can be automatically controlled wherein the fan control circuit 10A, 10B, and 10C would sequentially energize their respective fan, fan A, B, and C, to a low speed as the temperature increases. With further temperature increases, the respective high speed relay switches, 30A, 30B, and 30C, in each fan control circuit, 10A, 10B, and 10C are sequentially energized.

The respective starting system of each control circuit 10 can be connected to a single start switch 87' for simultaneously starting each fan control circuit 10.

Other features which may be included in the control circuits are low pass filters 80 and 81 at the inputs to amplifiers 27 and 29 to prevent any A.C. interference with the logical operation of the circuit. Also, lights 82 and 83 may be connected to the outputs of amplifiers 27 and 29 to provide a visual indication than the fan associated with that particular circuit 10 is operating, and the speed at which it is operating. For testing and calibration reasons, terminals 3a, 3b, and 3c of each circuit 10A, 10B, and 10C can each be connected to terminals A, B, and C respectively, as is shown in FIG. 1.

As resistances will vary in each bridge circuit for each fan control circuit 10, a need for calibrating each fan control circuit with a common reference value exits. This is accomplished by having a potentiometer 23 in each bridge circuit which can be adjusted so that each bridge circuit operates essentially the same as the other bridge circuits. To accomplish this result, referring to FIG. 1, the thermistors are disconnected and each input terminal 3 for its respective fan control circuit 10 is connected directly to the negative power supply point through potentiometer 84 by connecting terminal T to terminal A, B, or C as desired. The potentiometer 23 for each circuit 10 is then adjusted until a one is produced on the output of each amplifier 27, which acts to illuminate light 82. Each fan control circuit 10 can be appropriately calibrated in this fashion so that their respective amplifier 27 will produce a one under the same input conditions. Potentiometer 84, serves to simulate a thermistor.

While a particular embodiment of this invention has been shown and described, it is obvious that changes and modifications can be made without departing from the true spirit and scope of the invention. It is the intention of the appended claims to cover such changes and modifications.

The invention claimed is:

1. A control system for automatically controlling the operation of a cooling tower fan with a two speed fan motor in response to the temperature of the coolant circuit comprising:
    (a) means, responsive to the temperature of the coolant being above a predetermined first temperature, for producing a first actuating signal;
    (b) means, responsive to the first actuating signal, for producing a first energizing signal having a first predetermined time duration;
    (c) means, responsive to the first energizing signal, for turning the fan motor on at its low speed;
    (d) means, responsive to the first energizing signal, for producing an energy termination signal having a second predetermined time duration less than said first predetermined time duration;
    (e) means, responsive to the energy termination signal, for disconnecting power supplied to the fan motor, whereby the fan motor is first disconnected from its power supply for said second predetermined time duration before being turned on at its low speed.

2. A system as recited in claim 1, further comprising:
    (a) means, responsive to the temperature of the coolant being above a predetermined second temperature which is higher than said first temperature, for producing a second actuating signal;
    (b) means, responsive to the second actuating signal, for producing a second energizing signal having a predetermined time duration greater than that of the energy termination signal;
    (c) said means for producing an energy termination signal is also responsive to the second energizing signal to produce an energy termination signal, whereby power to the fan motor will be disconnected for a predetermined time interval before the fan motor is turned on to its high speed.

3. The system recited in claim 2, further comprising means, responsive to the second actuating signal, for preventing the means for producing a first energizing signal from producing a first energizing signal, thereby preventing the fan motor from possibly being energized simultaneously at two speeds.

4. The system recited in claim 3, wherein the first energizing signal producing means, the second energizing signal producing means, and the energy termination signal producing means each include a time delay circuit followed by a Schmidt-trigger circuit.

5. The system recited in claim 4, and including:
    (a) a wheatstone bridge circuit having a temperature sensitive resistor, reference terminal, and two output terminals;
    (b) said means for producing a first actuating signal is responsive to the voltage on the first output terminal becoming greater than the voltage on the reference terminal for producing the first actuating signal; and
    (c) said means for producing a second actuating signal is responsive to the voltage on the second output terminal becoming greater than the voltage on the reference terminal for producing the second actuating signal.

6. The system recited in claim 5, further including a circuit for applying power to said ststem when starting it so that it is preconditioned to operate properly, said start-up circuit comprising means for preventing the formation of the first energizing signal and the second energizing signal for a predetermined duration of time at the start up of the system.

* * * * *